US009240310B2

(12) United States Patent
Krutchinsky et al.

(10) Patent No.: US 9,240,310 B2
(45) Date of Patent: Jan. 19, 2016

(54) METHOD AND APPARATUS FOR IMPROVING ION TRANSMISSION INTO A MASS SPECTROMETER

(71) Applicant: The Rockefeller University, New York, NY (US)

(72) Inventors: Andrew N. Krutchinsky, New York, NY (US); Julio Padovan, New York, NY (US); Herbert Cohen, New York, NY (US); Brian T. Chait, New York, NY (US)

(73) Assignee: THE ROCKEFELLER UNIVERSITY, New York, NY (US)

( * ) Notice: Subject to any disclaimer, the term of this patent is extended or adjusted under 35 U.S.C. 154(b) by 0 days.

(21) Appl. No.: 14/698,364

(22) Filed: Apr. 28, 2015

(65) Prior Publication Data

US 2015/0318155 A1 Nov. 5, 2015

Related U.S. Application Data

(63) Continuation of application No. 13/827,727, filed on Mar. 14, 2013, now Pat. No. 9,048,079.

(60) Provisional application No. 61/759,645, filed on Feb. 1, 2013.

(51) Int. Cl.

| | |
|---|---|
| ***B01D 59/44*** | (2006.01) |
| ***H01J 49/06*** | (2006.01) |
| ***H01J 49/00*** | (2006.01) |
| ***H01J 49/42*** | (2006.01) |

(52) U.S. Cl.
CPC .......... *H01J 49/062* (2013.01); *H01J 49/0031* (2013.01); *H01J 49/4225* (2013.01)

(58) Field of Classification Search
None
See application file for complete search history.

(56) References Cited

U.S. PATENT DOCUMENTS

| | | | | |
|---|---|---|---|---|
| 3,294,970 A * | 12/1966 | Jenckel | .................. | H01J 17/00 250/423 R |
| 4,199,685 A * | 4/1980 | Hora | ..................... | B01D 59/34 250/423 P |

(Continued)

FOREIGN PATENT DOCUMENTS

| | | | |
|---|---|---|---|
| JP | 04013962 A * | 1/1992 | |
| JP | 2010157499 | 7/2010 | |
| WO | WO 2007027764 A2 * | 3/2007 | ........... H01J 49/423 |

OTHER PUBLICATIONS

Fenn, "Mass Spectrometric Impliations of High-Pressure Ion Sources," Int. J. Mass Spectrom. 2000, 200: 459.478.

*Primary Examiner* — Andrew Smyth
(74) *Attorney, Agent, or Firm* — Hoffmann & Baron, LLP

(57) ABSTRACT

An ion transfer device for transferring ions emerging from an electrospray ion source at atmosphere to a vacuum chamber includes an inner surface in the shape of a diverging conical duct. The ion transfer device has an entrance aperture for positioning proximate the exit port of the electrospray ion source emitter, the entrance aperture receiving the electrosprayed ions from the exit port of the electrospray ion source emitter at atmosphere, the diverging conical duct being an electrode toward which the ions migrate and having an exit aperture with an inner diameter larger than an inner diameter of its entrance aperture, the exit aperture enclosed in the vacuum chamber, the diverging conical duct transporting the ions from atmosphere to vacuum. The vacuum chamber can be a chamber of a vacuum housing enclosing a mass analyzer.

20 Claims, 11 Drawing Sheets

(56) References Cited

U.S. PATENT DOCUMENTS 4,977,320 A * 12/1990 Chowdhury ........ H01J 49/0404 250/281
4,980,057 A * 12/1990 Dorn .................. G01N 30/7246 210/149
5,015,845 A * 5/1991 Allen ............... G01N 27/44717 250/281
5,245,186 A 9/1993 Chait et al.
5,304,798 A * 4/1994 Tomany ............. G01N 30/7273 250/281
5,306,910 A * 4/1994 Jarrell ................ G01N 30/7266 250/286
5,504,327 A * 4/1996 Sproch .................. H01J 49/165 250/281
5,622,567 A * 4/1997 Kojima ................. C23C 14/022 118/726
5,747,799 A * 5/1998 Franzen ................ H01J 49/067 250/282
5,788,166 A * 8/1998 Valaskovic ............ B05B 5/0255 239/690
6,278,111 B1 * 8/2001 Sheehan ............... H01J 49/165 250/281
6,630,664 B1 * 10/2003 Syage ................... H01J 49/107 250/288
6,770,875 B1 * 8/2004 Guevremont .......... B01D 59/46 250/281
6,787,723 B2 * 9/2004 Pronko .................. B01D 59/44 204/157.2
6,831,274 B2 * 12/2004 Smith ................. H01J 49/0018 250/281
6,906,338 B2 * 6/2005 Tajima ................... H05H 15/00 250/396 R
6,958,480 B1 * 10/2005 Iyer ........................ B01J 20/103 250/340
7,047,171 B1 * 5/2006 Sproch ............... G01N 33/6848 250/288
7,317,192 B2 * 1/2008 Ma ........................... G21K 1/08 250/298
7,323,683 B2 * 1/2008 Krutchinsky ......... H01J 49/423 250/281
7,704,699 B2 * 4/2010 Sproch ............... G01N 33/6848 250/288
8,299,427 B2 * 10/2012 Mukaibatake ........ H01J 49/065 250/288
2003/0136905 A1 * 7/2003 Franzen ................ H01J 49/062 250/292
2003/0168591 A1 * 9/2003 Smith ................. H01J 49/0018 250/288
2004/0013820 A1 * 1/2004 Cadieu .................. C23C 14/221 427/596
2004/0069960 A1 * 4/2004 Maldonado ............ B82Y 10/00 250/492.24
2005/0082471 A1 * 4/2005 Kalinitchenko ...... H01J 49/105 250/286
2006/0050366 A1 * 3/2006 Kong .................... H01S 3/2333 359/337
2006/0186028 A1 * 8/2006 Hughes .................. G01N 30/10 210/198.2
2006/0215712 A1 * 9/2006 Ziener .................... H05G 2/003 372/2
2007/0037288 A1 * 2/2007 Qian .................. G01N 33/2876 436/143
2007/0045533 A1 * 3/2007 Krutchinsky ......... H01J 49/423 250/290
2008/0104064 A1 * 5/2008 Li ......................... H01J 49/165
2008/0116371 A1 * 5/2008 Wouters ................ H01J 49/067 250/288
2009/0050801 A1 * 2/2009 Fedorov ................ H01J 49/066 250/288
2009/0236515 A1 * 9/2009 Sproch ............... G01N 33/6848 250/282
2010/0059675 A1 * 3/2010 Mukaibatake ........ H01J 49/065 250/288
2010/0173330 A1 * 7/2010 Fulton ................ B01J 20/28004 435/7.9
2010/0252727 A1 * 10/2010 Seastrom ............. H01J 49/165 250/282
2010/0320374 A1 * 12/2010 Jarrell ................... H01J 49/067 250/282
2010/0323372 A1 * 12/2010 Fulton ................ B01J 20/28004 435/7.72
2011/0107822 A1 * 5/2011 Bunner ............. B01L 3/502792 73/61.52
2012/0085903 A1 * 4/2012 Trimpin ................ H01J 49/044 250/282
2013/0214154 A1 * 8/2013 McEwen ............. H01J 49/0404 250/288
2014/0014747 A1 * 1/2014 Moeller .................. H01J 49/10 239/690
2014/0027631 A1 * 1/2014 Trimpin ................ H01J 49/165 250/282

* cited by examiner

METHOD AND APPARATUS FOR IMPROVING ION TRANSMISSION INTO A MASS SPECTROMETER

CROSS-REFERENCE TO RELATED APPLICATIONS

This application is a continuation of co-pending U.S. patent application Ser. No. 13/827,727, filed on Mar. 14, 2013, which claims priority to U.S. Provisional Application No. 61/759,645, filed Feb. 1, 2013, the entirety of which is incorporated herein by reference thereto.

STATEMENT REGARDING FEDERALLY FUNDED RESEARCH

This invention was made with government support under grants RR00862 and GM103314 awarded by the National Institutes of Health. Accordingly, the government has certain rights in the invention.

TECHNICAL FIELD

The present disclosure relates to a method and apparatus for improving ion transmission into a mass spectrometer, and, more particularly, to a method and apparatus for improving the transfer of ions between atmosphere and a vacuum region of a mass spectrometer, and to a mass spectrometer with improved ion transfer thereto.

BACKGROUND

The performance of scientific instruments, such as mass spectrometers, which operate under vacuum conditions with the ions of interest produced externally at atmospheric pressure are profoundly affected by the efficiency of ion transfer between the atmosphere and vacuum regions of the instrument. As transfer efficiency increases, loss of ions produced from the sample of interest is reduced, and the number of informative ions that enter the instrument is increased. This can result in increased speed of analysis, resolution, and sensitivity of the instrument.

Among the most rudimentary atmosphere-vacuum interfaces is a small orifice in the first vacuum chamber evacuated by a roughing pump to pressures of about 1-10 Ton. The pumping speed of typical roughing pumps is usually a few liters/s, which places a limit on the diameter of the orifice of typically less than 0.5 mm. Ion beams created this way are usually poorly collimated, so that the beam diameter quickly increases downstream of the orifice. To avoid destroying the ion beam and incurring ion losses, a skimmer electrode is typically positioned 4-7 mm downstream of the orifice to provide a means for ion passage further into the next higher vacuum stage of the instrument, as described, for example, in a publication by Fenn, "Mass spectrometric implications of high-pressure ion sources," *Int. J. Mass Spectrom.* 2000, 200: 459-478.

The first atmosphere-vacuum interfaces for coupling electrospray ionization (ESI) sources to mass spectrometers were designed on this principle, and some mass spectrometer manufacturers still use this design with little or no modifications. One disadvantage of this rudimentary interface is the absence of an efficient means to supply heat to the small charged droplets produced by ESI and the associated heavily solvated ions after they have entrained in the supersonic jet formed by gas expansion into the vacuum.

The effects of adiabatic expansion cooling can be counteracted to some extent by creating a declustering potential between the orifice and the skimmer. However, the amplitude of the declustering voltage cannot be very large because it will induce dissociation of the already desolvated ions. Other modifications to this rudimentary interface previously proposed to improve the ion desolvation process include introducing a counter flow of heated gas (sometimes referred to as a heated gas curtain), heating the entire interface, and installing a heated laminar flow chamber (particle discriminator interface, PDI) in front of the orifice. However, these modifications are expensive, and/or frequently of very limited efficiency, often requiring precise controls for optimization of temperature and gas flows for the particular analyte and solvent system. Such controls are needed to insure complete desolvation and to prevent a decrease in sensitivity from ions being swept away at gas flow rates that are too high.

One efficient solution to improving the ion desolvation process without the need for precise gas flow control is described in co-owned U.S. Pat. No. 4,977,320 to Chowdury, et al., (hereinafter, "Chowdury"), entitled "Electrospray Ionization Mass Spectrometer with New Features," which issued on Dec. 11, 1990. In the method disclosed by Chowdury, solvated ions formed by an electrospray ionization of an analyte solution at atmospheric pressure were introduced into a first vacuum chamber of a mass spectrometer through a metal capillary heated to, for example, about 85° C. The capillary in Chowdury is about 0.5 mm in diameter and of 203 mm in length, and projects into the first vacuum chamber 21 of the mass spectrometer. Chowdury further discloses that heating of the capillary tube causes evaporation of the droplets and desolvation of the resulting molecular ions of interest for analysis. Such ion interfaces containing a heated metal capillary or an array of heated capillaries instead of a simple orifice have since became widely adopted by mass spectrometry manufacturers and researchers, especially when high flow-rate ESI ion sources are coupled to mass spectrometers.

With the advent of nano-flow ESI ion sources, or low flow-rate electrospray ionization sources, the sensitivity of mass spectrometers coupled to on-line chromatography has dramatically increased (see, e.g., U.S. Pat. No. 5,788,166 to Valaskovic, et al., entitled "Electrospray ionization source and method of using the same," issued Aug. 4, 1998). Nano-flow ESI emitters can potentially provide better conditions for sample ionization and, ultimately, higher ionization efficiency than the standard electrospray sources based on the heated metal capillary as described in Chowdury. However, little optimization has been made to ion interfaces that operate with nano-flow ESI sources to increase the efficiency of ion transfer between the atmosphere and the vacuum interface of a mass spectrometer.

Accordingly, there is still a need for a method and apparatus for improving the transfer of ions from atmosphere into a vacuum region of a mass spectrometer, particularly for mass spectrometers for coupling nano-flow ESI ion sources thereto.

SUMMARY

The present disclosure provides a method and device for improving the transfer of ions from atmosphere into a vacuum stage of a mass spectrometer. The present disclosure additionally provides a mass spectrometer including the ion transfer device for coupling an ESI ion source thereto.

In one aspect, a system for the analysis of the mass spectra of ions includes an electrospray ion source generating ions for analysis, the electrospray ion source comprising an exit port from which the ions are electrosprayed at atmosphere; a mass analyzer having an inlet port enclosed in a vacuum housing for receiving the ions to be analyzed; and a diverging conical duct electrode having an entrance aperture and an exit aperture, the exit aperture having an inner diameter larger than an inner diameter of the entrance aperture, the entrance aperture positioned proximate the exit port of the electrospray ion source for receiving the ions at atmosphere from the electrospray ion source, and wherein the exit aperture is enclosed in the vacuum housing and operatively coupled to the inlet port for transporting the ions from atmosphere to the mass analyzer under vacuum.

In another aspect, an ion transfer device for transferring ions emerging from an electrospray ion source, having an exit port for spraying the ions at atmosphere, to a vacuum chamber, includes an inner surface in the shape of a diverging conical duct. The ion transfer device has an entrance aperture for positioning proximate the exit port of the electrospray ion source, the entrance aperture receiving the electrosprayed ions from the exit port of the electrospray ion source at atmosphere. The diverging conical duct is an electrode toward which the ions migrate and has an exit aperture with an inner diameter larger than an inner diameter of the entrance aperture, the exit aperture configured to be operatively coupled to the vacuum chamber for transferring the ions thereto.

In addition to the above aspects of the present disclosure, additional aspects, objects, features and advantages will be apparent from the embodiments presented in the following description and in connection with the accompanying drawings.

DETAILED DESCRIPTION OF THE EMBODIMENTS

The following sections describe exemplary embodiments of the present disclosure. It should be apparent to those skilled in the art that the described embodiments of the present disclosure provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto.

The present disclosure is directed to a method and apparatus for improving the transfer of ions from the atmosphere into a vacuum of a mass spectrometer. The present disclosure is also directed to a mass spectrometer including the ion transfer apparatus of the disclosure.

Figure 1:
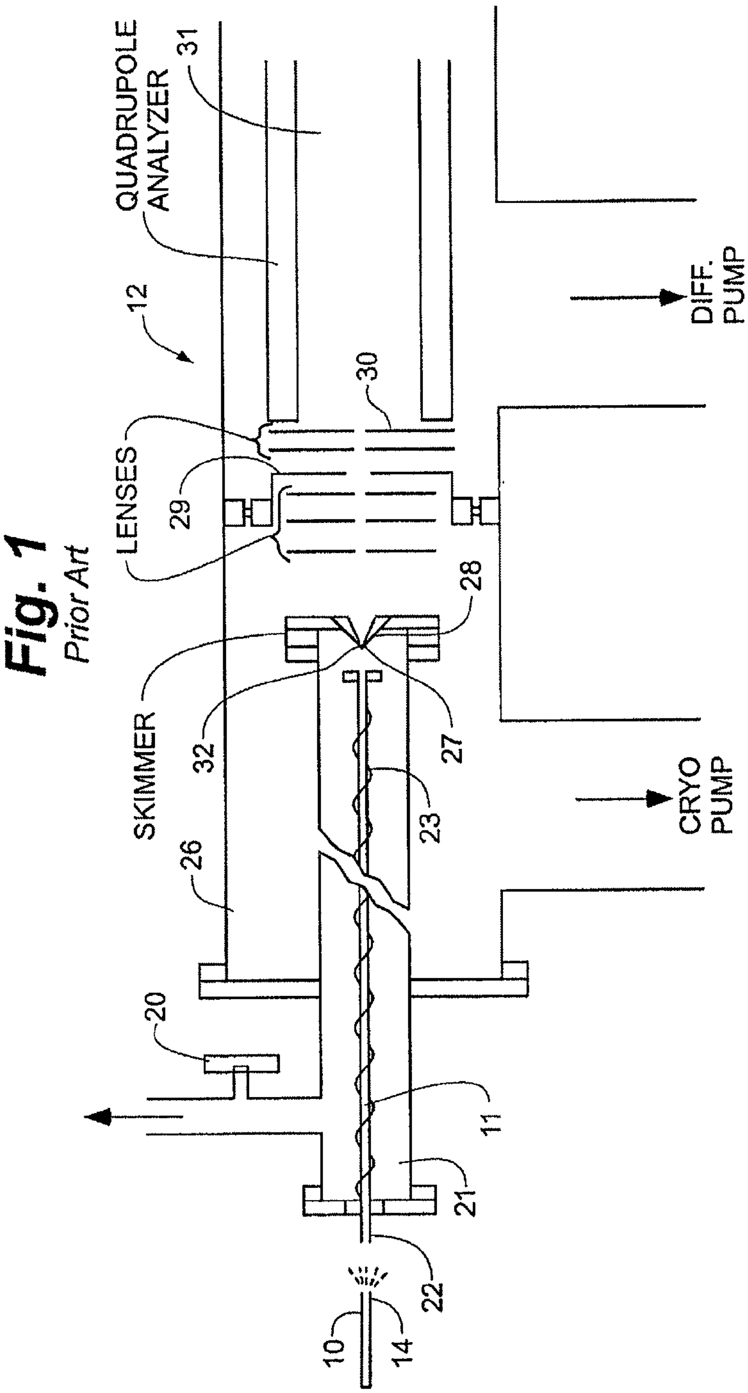
Fig. 1 Prior Art
FIG. 1 is a schematic representation of a prior art mass spectrometer.

Referring to FIG. 1, a prior art electrospray ionization mass spectrometer is described in co-owned U.S. Pat. No. 4,977,320 to Chowdhury, et al., in which a long metal capillary tube 11 is used to couple the ionized spray emitted from an electrospray needle tip 14 at atmospheric pressure to a vacuum pressure chamber 21 in order to inject the ions into a mass analyzing chamber 31. The capillary tube 11 is also heated to preferably about 85 C to cause the ionized droplets and solvated ions to undergo continuous desolvation as they pass through the tube 11.

While the use of a heated capillary advantageously improved the ion desolvation process without the need for precise gas flow control, the efficiency of ion transmission into the vacuum chamber 21 using the capillary tube disclosed in Chowdhury is still low.

Figure 2:
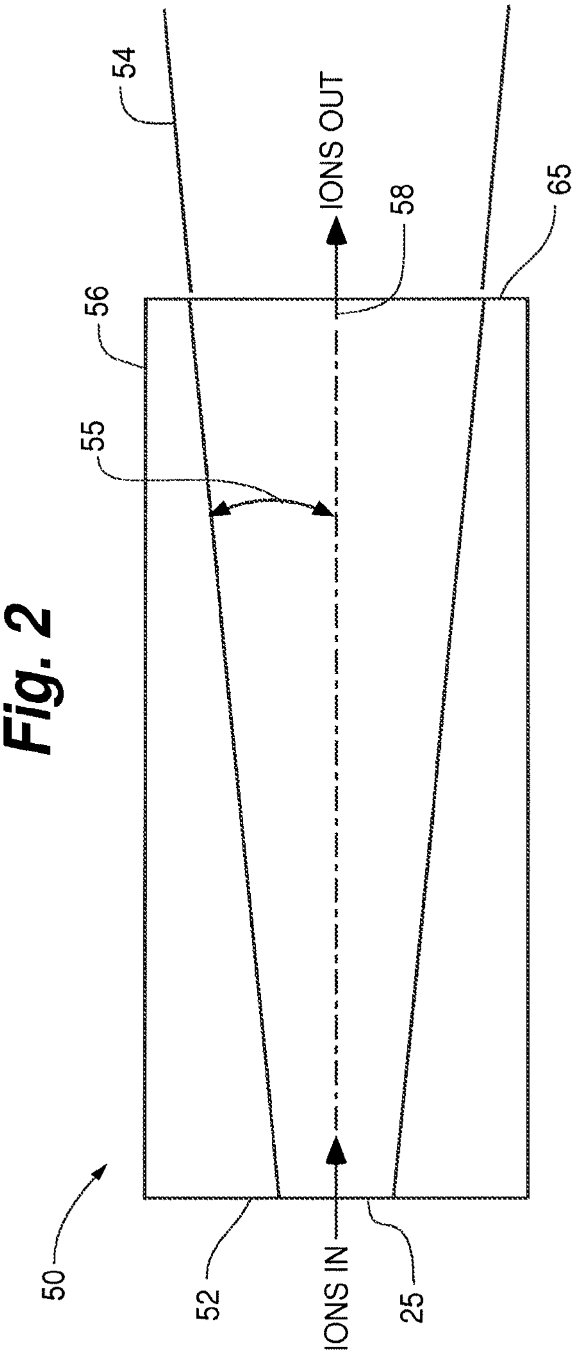
FIG. 2 is a schematic representation of a cross-section of an embodiment of an ion transfer device of the present disclosure.

Referring to FIG. 2, the present inventors discovered that, surprisingly, a slowly diverging conical duct 52 provides a superior interface over the capillary tube of the prior art as an ion transfer device 50 for coupling electrosprayed ions from an electrospray source at atmosphere to a mass spectrometer at vacuum. In one embodiment of an ion transfer device formed in accordance with the present disclosure, about 75 to about 99% of ions from a nano-flow ESI ion source placed a distance from an inlet port 25 of the device 50 can be transferred into vacuum through the ion transfer device 50, resulting in a total transmitted ion current of higher than 200 nA from a nano-flow ESI source. This translates to an improved total transmitted current to a mass analyzer through the ion transfer device 50 from about 10 to about 100 times higher than can be achieved under similar conditions in commercial mass spectrometers that utilize a heated capillary as a key element of the interface.

Though not wishing to be bound by any particular theory, the inventors contemplate that the phenomenon of flow separation may be at least partially responsible for this surprising discovery of improved ion transmission through the slowly diverging conical duct of the present disclosure. It is surmised that the flow separation likely occurs when the gas/liquid moves in the diverging duct with a velocity higher than some critical velocity. The present inventors have demonstrated that an ion beam 54 produced from embodiments of the ion transfer device 50 has advantageous properties, including that: (i) it does not interact with inner walls 56 of the device 50 (presumably after flow separation takes place); and (ii) as the ion beam 54 propagates, it diverges very slowly. For example, measurements of a divergence of the ion beam 54 relative to a central longitudinal axis 58 of one embodiment of the diverging conical duct 52 were taken, showing a divergence angle of about 0.6 degrees. Such narrow ion beams can be efficiently heated, for example, by radiative heat from an encompassing heated sleeve, to provide ion desolvation.

In one embodiment of the present disclosure, the ion transfer device includes a diverging conical duct with an inner diameter of the inlet port between about 0.1-1 mm and an inner diameter of an exit port between about 0.2-5 mm, an inner diameter of an exit port of the device being greater than the inner diameter of the inlet port.

Preferably, the inner diameter of the inlet port is from about 0.3 mm to about 0.6 mm.

In another embodiment of the present disclosure, the ion transfer device includes a diverging conical duct with inner walls forming an angle of divergence 55 with the longitudinal axis 58 of the diverging conical duct 52 of from about 0.6 to about 1.0 degrees.

Preferably, the angle of divergence 55 is from about 0.7 degrees to about 0.9 degrees.

In other various embodiments, the angle of divergence 55 is less than about 1.0 degree and greater than about 0.6 degree and the inner diameter of the inlet port is about 0.4 mm.

In various additional embodiments of the present disclosure, a length of the diverging conical duct of the ion transfer device is from about 1 to about 200 mm. Preferably, the length is from about 5 to about 10 mm.

In a preferred embodiment, an inner diameter of the inlet port is between about 0.3 mm and about 0.5 mm, the angle of divergence 55 is between about 0.6 and about 0.9 degree, and the length of the diverging conical duct of the ion transfer device is at least about 7 mm.

The diverging conical duct of the ion transfer device is preferably maintained at a voltage of between about 0 and about 1000 V. The diverging conical duct is also preferably heated by any means known in the art to a temperature between about 273K and about 600K.

The diverging conical duct can be formed of any material appropriate for forming an electrode, which also conducts heat, including metals, conductive plastics, conductive glass, and so on. In a preferred embodiment the diverging conical duct is formed of conductive plastic.

Figure 3:
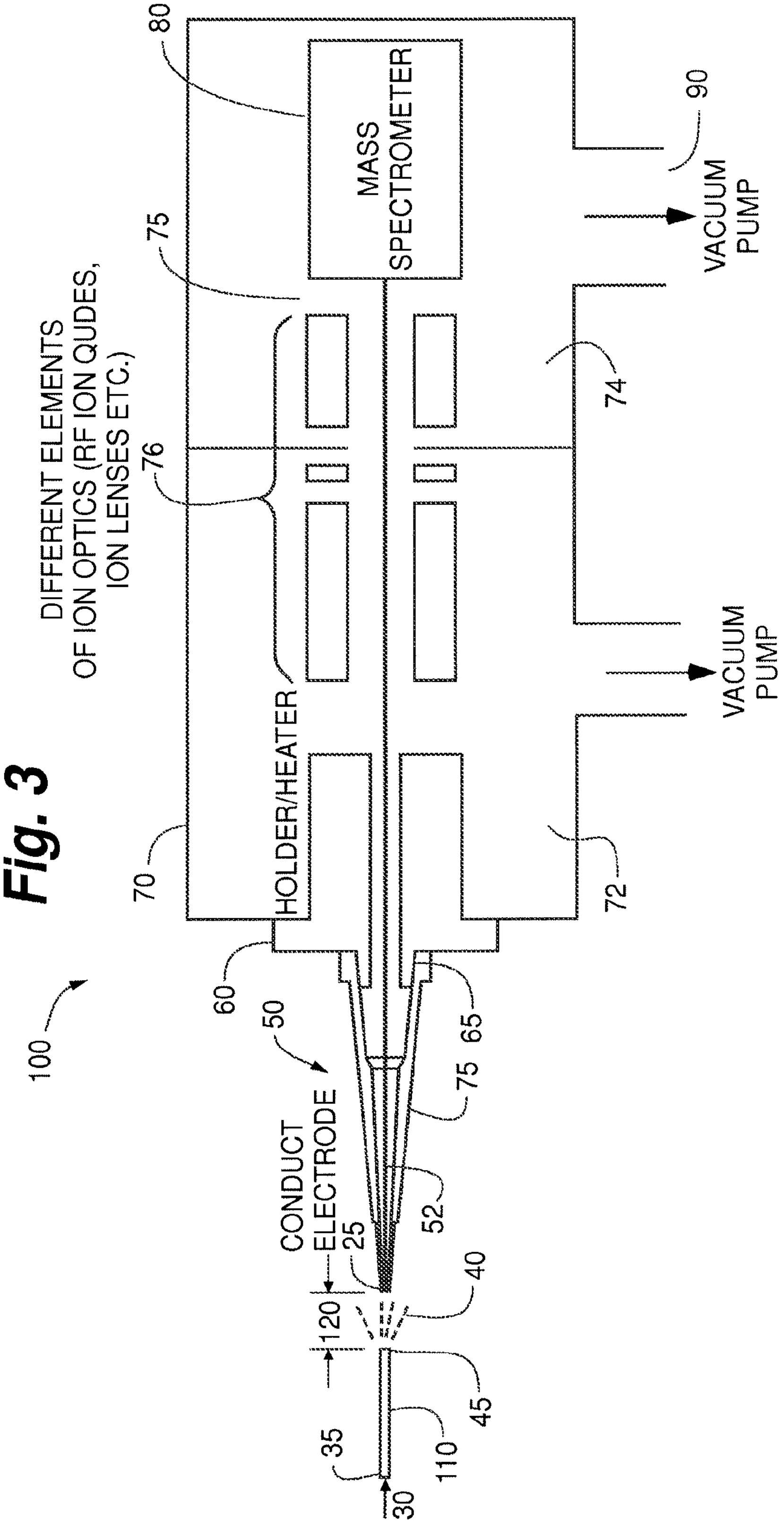
FIG. 3 is a schematic representation of a cross-section of an embodiment of a system formed in accordance with the present disclosure for the analysis of the mass spectra of ions formed from molecules of interest.

Referring to FIG. 3, an embodiment of a system 100 for the analysis of the mass spectra of ions formed from molecules of interest includes the ion transfer device 50 of the present disclosure for coupling electrosprayed ions 40 from atmosphere to a mass spectrometer or analyzer 80 maintained in a vacuum housing 70. The electrosprayed ions 40 can be produced by introducing a dilute solution of the molecules of interest 30 into an inlet port 35 of the electrospray ion source 110. The ion source 110, which can be a nano-electrospray ion source, transports the dilute solution 30 and charges droplets of the solution to produce a divergent cone of electrosprayed ions 40 emitted from an exit port 45. A high voltage source maintains the ion source 110 at a high voltage relative to the ion transfer device 50, preferably at about 1 kV to about 2 kV. The system 100 also preferably includes a heating device 75 for heating the diverging conical duct 52 and a voltage source 155 for maintaining or altering a voltage applied to the diverging conical duct 52 of the ion transfer device 50, preferably between 0 and 400V. The diverging conical duct 52 forms an electrode, the voltage differential formed between the ion source 110 and the diverging conical duct 52 causing the charged droplets emitted from the ion source to migrate along electric field lines toward the entrance 25 of the diverging conical duct 52.

The mass analyzer 80 can be a quadrupole mass analyzer, like that shown in FIG. 1, an ion trap mass analyzer, a time-of-flight mass analyzer, or any mass analyzer known in the art.

In various embodiments of the system, the diverging conical duct 52 can be coupled to the front of the (first) vacuum stage of the mass spectrometer. In other embodiments, the diverging conical duct 52 can extend into the vacuum chamber.

In various embodiments of the system of the present disclosure, a gap 120 between the exit port 45 of the ion source 110 and an inlet port 25 of the ion transfer device 50 can preferably be varied as necessary to obtain optimum coupling efficiency of ions to the analyzer 80.

In one embodiment, a gap between the exit port 45 and the inlet port 25 is between about 10 mm and about 0.1 mm. In another embodiment, the gap is less than about 4 mm.

In one preferred embodiment the ion source 110 is a nano-flow ESI.

In other embodiments, the nanoflow ion source can be coupled to the end of a liquid chromatography system, to a liquid pumping system, or simply to a tube containing the liquid to be electrosprayed.

Referring still to FIG. 3, the vacuum housing 70 can include a first vacuum chamber 72, to which an exit port 165 of the ion transfer device 50 is coupled, and a second vacuum chamber 74, as well as various elements including ion optics 76, such as a skimmer, lenses, RF guides and so on between the exit port 65 of the ion transfer device 50 and a receiving port 75 of the analyzer 80.

Figure 4:
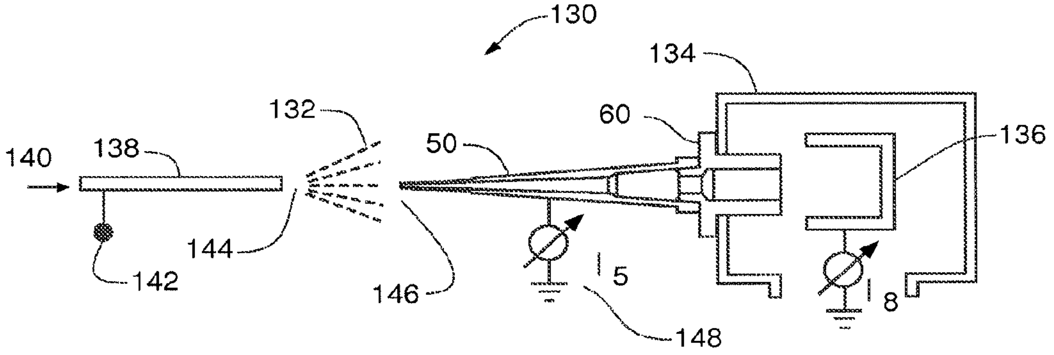
FIG. 4 is a schematic representation of a cross-section of a measurement apparatus for measuring transmission efficiency and transmitted current through an electrode interface of electrosprayed ions between atmosphere and a vacuum chamber.

Referring to FIG. 4, an experimental measurement apparatus 130 was assembled to compare an embodiment of the ion transfer device 50 of the present disclosure with other types of interfaces for coupling electrosprayed ions 132 from atmosphere to a vacuum chamber 134, representing a vacuum stage of a mass spectrometer. A Faraday cup 136 was positioned in place of an analyzer of a mass spectrometer for measuring the ion current transmitted ($I_8$). The ion source 138 for generating the ions 132 from a diluted sample 140 was a standard liquid junction nano-flow ESI ion source mounted on an x-y-z-stage. New Objective PicoTip capillary emitters having 10±1 μm pulled tip orifices (unless otherwise noted) were used for the nano-ESI ion source. For the high voltage supply 142, a Bertran supply was used. Two different solutions were electrosprayed: 60%/39%/1% MeOH/H2O/acetic acid (from Fisher) and 0.1% v/w brilliant blue R dye (from Sigma-Aldrich) in 50/50 MeOH/H2O. The solutions were introduced into the emitter 138 by a Harvard syringe pump with a flow rate of about 100/hour. The x-y-z-stage was used to align the exit tip 144 of the emitter 138 relative to the entrance 146 of the particular atmosphere/vacuum interface under test, for optimizing alignment of the ESI-produced spray 132 of ions and droplets through each of the atmosphere/vacuum interfaces tested.

Figure 5A:
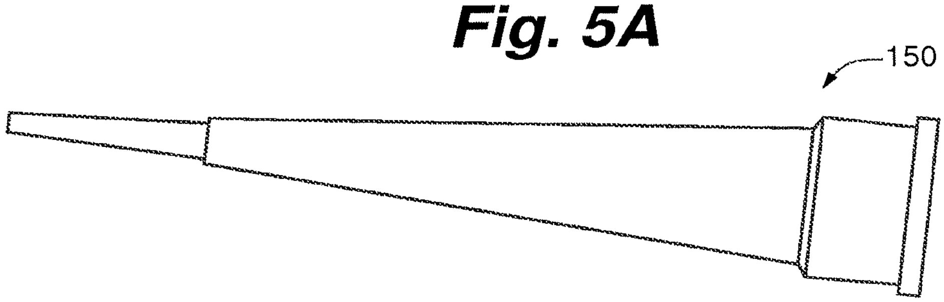
FIG. 5A is a perspective representation of an embodiment of an ion transfer device of the present disclosure.
Figure 5B:
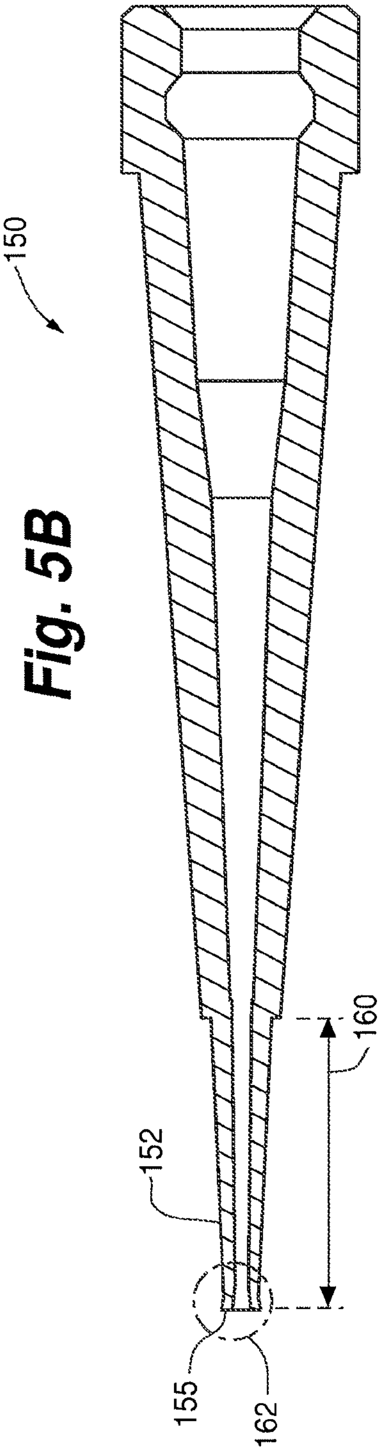
FIG. 5B is a schematic representation of a cross-section of an embodiment of the ion transfer device of FIG. 5A.
Figure 5C:
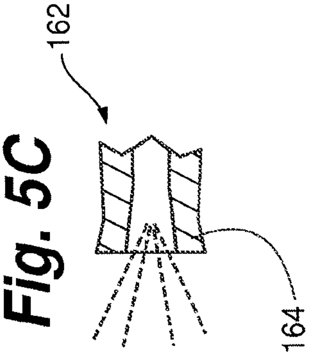
FIG. 5C is a magnified view of the tip of the ion transfer device of FIG. 5B.

Referring to FIG. 5A, in one embodiment the diverging conical duct of an ion transfer device of the present disclosure is provided by a standard conductive plastic 0.3-10 μl pipette tip 150. A representation of a cross-section of one example of the pipette tip, exposing internal walls that form a slowly diverging conical duct, is provided in FIG. 5B.

The pipette tip 150 is made from conductive plastic, is about 30 mm long, and is available from Advion, 10 Brown Road, Suite 101, Ithaca, N.Y. 14850 USA, as Part No. Catalog: CS 109. The tip 150 contains a 7 mm-long section 160 of slowly diverging conical duct at its inlet tip 155, with an angle of divergence of about 0.8°. It was found that this section 160 alone can transmit ions better than any other type of electrode tested. The pipette 150 also contains additional diverging ducts with larger angles of divergence that have an effect on ion transmission, improving the transmission further over the 7 mm section alone. Referring to the circular inset 162 of FIG. 5B, the inner passage at the inlet 155 was additionally shaped (using a pin) to widen an inner diameter 164 at the inlet 155 of the ion transfer device to improve the suction flow of air into the diverging conical duct 152.

To compare the ion transmission through the conductive plastic tip 150, an embodiment of an ion transfer device of the present disclosure, with the transmission through other types of interfaces commonly used to transmit ions into a vacuum stage of a mass spectrometer, the conductive plastic tip 150 was replaced with different types of electrode interfaces and tested with the same apparatus 130. All of the electrodes were heated during the measurements. The electrode holder 60 was changed as needed to accommodate the different sizes of interfaces tested. Both custom-made capillaries having an Inner Diameter (ID) of about 0.5 mm, Outer Diameter (OD) of about 1.64 mm, and length of about 5 to about 200 mm, and commercial capillaries taken from various commercial electrospray instruments (from LCQ, LTQ and Velos mass spectrometers, available from Thermo Fisher Scientific) were tested, including: a capillary from an LCQ-IT mass spectrometer (manufacturing year ~2000) with dimensions: ID~0.5 mm, OD~1.56 mm, length~184.4 mm; a capillary from an LTQ-IT mass spectrometer (manufacturing year ~2005) with dimensions: ID~0.5 mm, OD~1.56 mm, length~101.7 mm; and a capillary from a Velos-IT mass spectrometer (manufacturing year ~2011) with dimensions: ID~0.05 mm, OD~1.56 mm, length~58.6 mm. A representative capillary 180 mounted with an electrode holder 62 to the vacuum chamber 134 is shown in FIG. 6A.

Figure 6A:
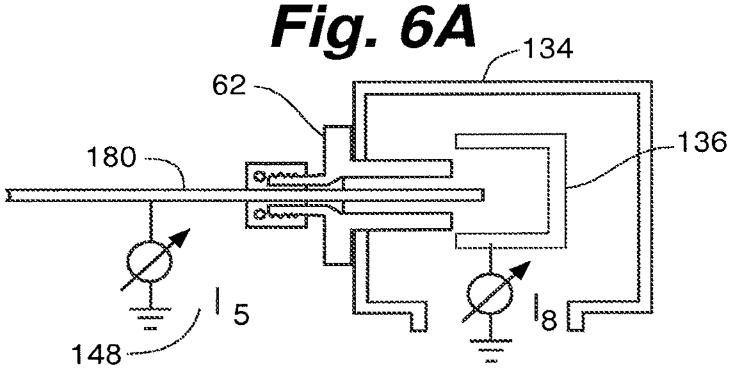
FIGS. 6A-6C are schematic representations of a cross-section of the measurement apparatus shown in FIG. 4, with three different electrode interfaces coupled to the vacuum chamber for measuring transmission efficiency and transmitted current through the different electrode interfaces to the vacuum chamber.
Figure 6B:
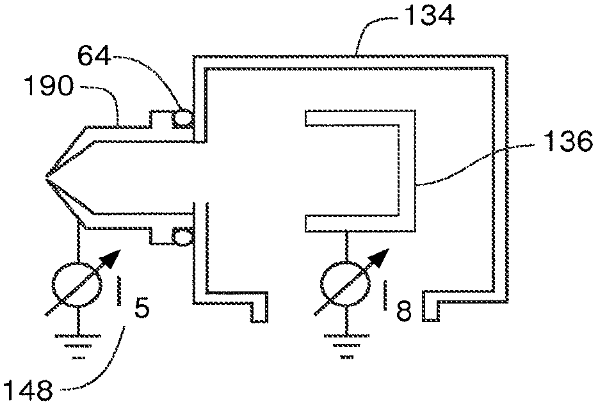
Figure 6C:
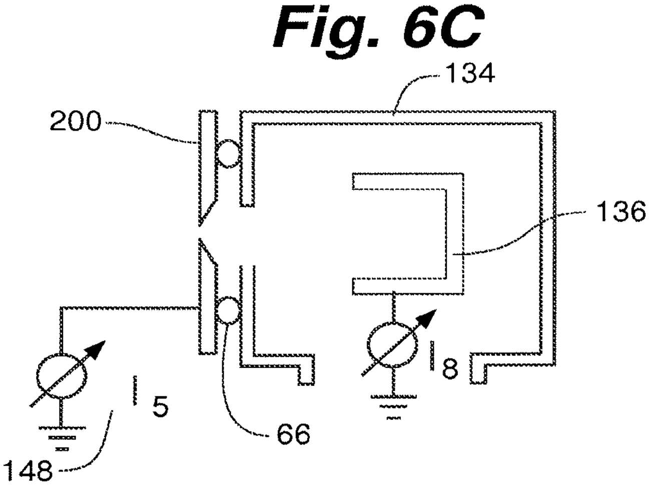

Referring to FIG. 6B, also tested was an electrode 190 from a commercial Synapt QqTOF mass spectrometer (available from Waters Corporation, 34 Maple Street, Milford, Mass. 01757), which has a ~0.3 mm diameter inlet orifice for accepting electrosprayed ions, followed by a short cone-shaped section that opens into a 8.3 mm ID tube for transferring the ions into the vacuum stage of a mass spectrometer. Referring to FIG. 6C, also measured was the ion transmission through a 0.5 mm diameter hole in a flat electrode 200 of thickness 0.03 mm. This electrode is a good example of the electrodes used in rudimentary, orifice-type ion interfaces, as for example in the mass spectrometers manufactured by AB Sciex 71 Four Valley Drive, Concord, Ontario, L4K 4V8, Canada. In each case, an appropriate electrode holder 62, 64, 66 was used to couple the interface to the vacuum chamber 134, as shown in FIGS. 6A, 6B, and 6C, respectively.

To test the efficiency of ion transmission through the various interfaces into the vacuum chamber 134, the value of the emitted ion current 148 was measured ($I_5$ in FIGS. 6A-C; FIG. 4) from the nano-flow ESI ion source 138 and were compared with the current of ions that passed through the orifices or channels in the different electrodes as detected and measured ($I_8$ in FIGS. 6A-C; FIG. 4) by the Faraday cup 136.

The currents were measured with a picoammeter (Keithley, Model 480). The vacuum chamber 148 was evacuated with an Edwards 12 two-stage rotary pump with an effective speed of ~12.8 l/s (the nominal pumping speed of ~14.2 l/s was corrected for the experimentally measured conductance of the hose connecting the vacuum chamber 134 with the pump. The typical pressure in the chamber was in the range of about 3-8 Torr, depending on the geometry and type of electrode interface being measured.

The various metal capillaries 180 and the electrode holder 62 were heated by an electric heater to between about 80-200° C. The plastic tips can also be heated by heating an electrode holder (6), but the distribution of temperature along the tip was not measured.

Referring to FIGS. 7A, 7B, 9A and 9B, the ion transmission efficiency of the full conical duct was measured, as shown in FIG. 4, and compared with the measured transmission efficiency of a variety of metal capillaries collected from the different commercial mass spectrometers, as described above for the capillary 180 shown in FIG. 6A. Referring to FIGS. 8A and 8B, the ion transmission efficiency was also similarly measured for just the 7 mm front section of the pipette.

Figure 7A:
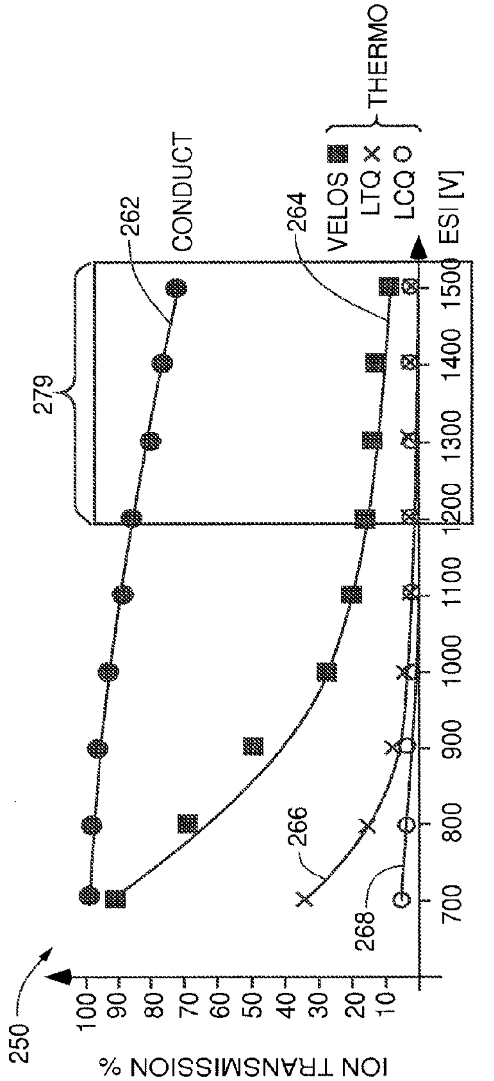
FIG. 7A is a graphical representation of the ion transmission through the ion transfer device of FIG. 5B compared to the ion transmission through various commercial capillary interfaces.
Figure 7B:
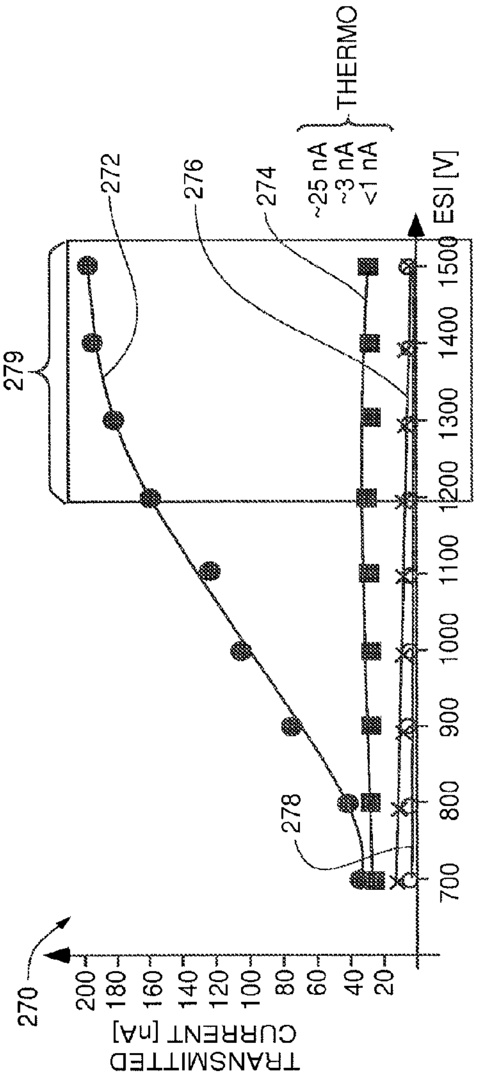
FIG. 7B is a graphical representation of a transmitted current through the ion transfer device of FIG. 5B compared to the ion current through various commercial capillary interfaces.
Figure 8A:
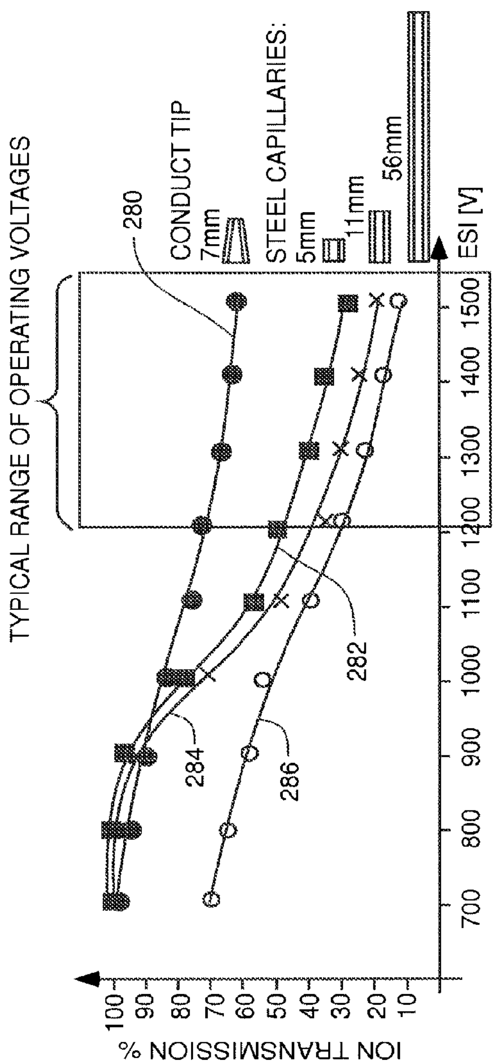
FIG. 8A is a graphical representation of an ion transmission through the slowest diverging conical duct portion of the ion transfer device of FIG. 5B compared to the ion transmission through capillary interfaces of varying lengths.
Figure 8B:
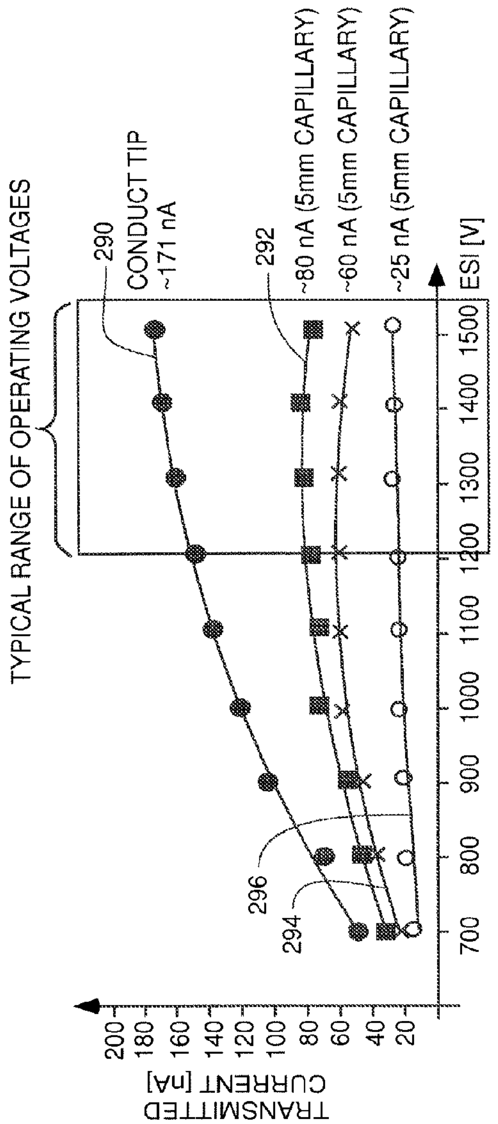
FIG. 8B is a graphical representation of the transmitted current through the slowest diverging conical duct portion of the ion transfer device of FIG. 5B compared to the ion transmission through capillary interfaces of varying lengths.

Referring to FIGS. 7A and 7B, the transmission efficiency 250 and absolute transmitted current 270 through the different types of capillaries and through an embodiment of the diverging conical duct of the present disclosure, based on the conductive plastic pipette 150 described above. The transmission efficiency 262 of the conductive plastic pipette 150 was measured to be at least 5 times higher than that measured for the various capillaries tested 264 (Velos), 266 (LTQ), and 268 (LCQ), for voltages in a normal operating range of about 1200-1500 volts used for most typical nano-flow ESI liquid chromatography/mass spectrometry (LC/MS) experiments. As shown in FIG. 7B, the transmitted current was measured to be 10-100 times higher for the conical duct electrode 272 than that measured for the straight capillaries 274, 276, 278 in the same operating voltage range 279.

It is worth noting that at low electrospray voltages, around ~700 V, the transmission efficiency of the Velos-IT capillary 264 is almost as high as the transmission of the plastic tip 262 (~100%). This, perhaps, can be explained by a rather unidirectional "dripping" mode of electro-spraying at lower voltages. This tendency is quickly broken as the voltages are increased to the operating values between 1200 to 1500 volts needed to reach the "Cone-Jet" mode of spraying needed for robust performance of nano-flow ESI LC/MS experiments.

Referring to FIG. 8A and FIG. 8B, the transmission efficiency and absolute transmitted current were measured through 0.5-mm ID metal capillaries of varying lengths and compared to those measured for the 7-mm section 160 of the conductive plastic tip 150, which was cut from the end portion of the plastic pipette 150. This slowly diverging section 160 has a divergence angle of ~0.8°. The transmission efficiency 280 and the transmitted current 290 of this slowly diverging section 160 were measured to be at least 2 times higher than the transmission efficiency 282 and transmitted current 292 measured for the shortest metal capillary (5 mm), and even higher than those measured for an 11-mm long capillary 284, 294 and a 56-mm long capillary 286, 296 in the operating voltage range of 1200-1500 Volts 279. This result shows that the slowly diverging conical duct 160 at the tip of the full conical conductive pipette 150 plays an important role in maximizing the ion current transmitted.

Accordingly, the tendency of shortening metal capillaries to improve transmission was shown to have limited potential, in that the ion transmission efficiency and the total transmitted current increases rather slowly as the metal 0.5 mm ID capillary was shortened from 56 mm (286, 296), down to 11 mm (284, 294), and then to 5 mm in length (282, 292) as shown in FIGS. 8A and 8B.

Figure 9A:
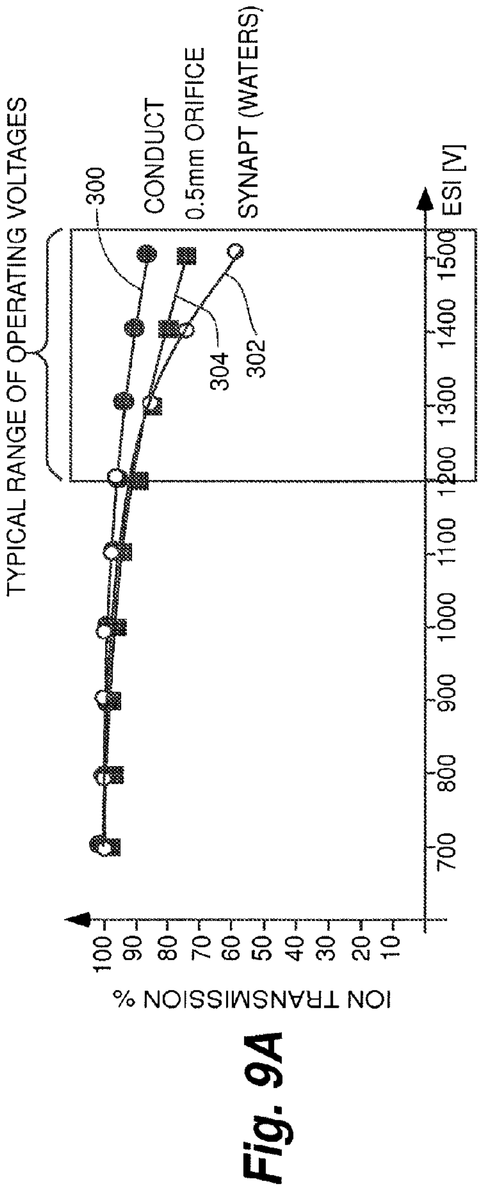
FIG. 9A is a graphical representation of the ion transmission through the ion transfer device of FIG. 5B compared to the ion transmission through various commercial rudimentary orifice interfaces.
Figure 9B:
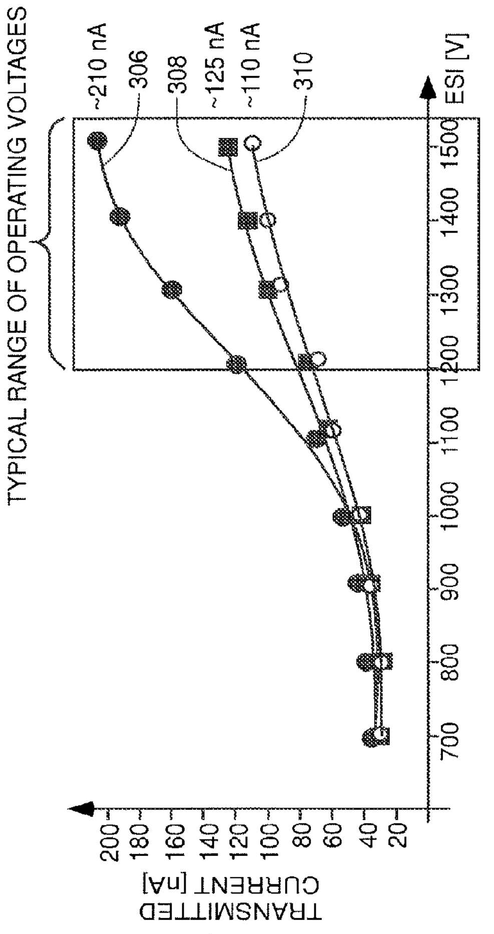
FIG. 9B is a graphical representation of the transmitted current through the ion transfer device of FIG. 5B compared to the ion transmission through various commercial rudimentary orifice interfaces.

Referring to FIGS. 9A and 9B, the ion transmission efficiency 300 of the same slowly diverging conical section 160 of the plastic pipette 150 was found to be only slightly higher than that 302 of the electrode 190 (as shown in FIG. 6B), or than the transmission efficiency 304 through a rudimentary flat electrode 200 with a 0.5 mm orifice (as shown in FIG. 6C). However, under similar conditions, the transmitted current 306 for the slowly diverging conical section 160 was about 2 times higher than that 308, 310 measured through these other electrodes 190, 200 over the operating voltage range 279 of 1200-1500 Volts.

The higher ion transmission efficiency of the "orifice" type of interfaces (as compared to a capillary type) may stem from the very limited time for interaction of the ions with the walls of an orifice of the order of fraction of a 1 μs. Beams formed by passing through capillaries, on the other hand, may spend 0.1-1 ms in the duct. The longer ion residence time in the capillaries have both positive and negative consequences. On the positive side, the long residence time in the heated capillary can ensure efficient desolvation of heavily solvated ions and small droplets by radiation heating. On the other hand, the longer opportunity for interaction of the beam with the capillary walls may lead to more substantial ion losses.

Figure 10A:
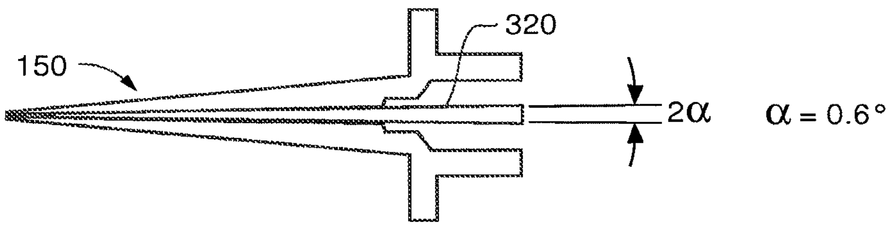
FIG. 10A is a schematic representation of the ion beam, and measured divergence of the beam, observed in the ion transfer device of FIG. 5B.
Figure 10B:
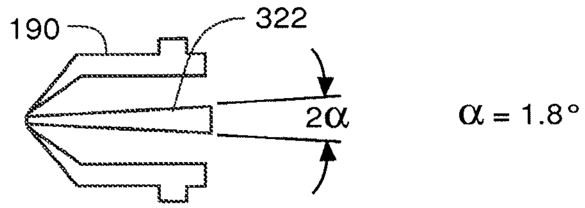
FIGS. 10B and 10C are schematic representations of the ion beams, and measured divergence of the beams, observed in the rudimentary orifice interfaces shown in FIGS. 6B and 6C, respectively.
Figure 10C:
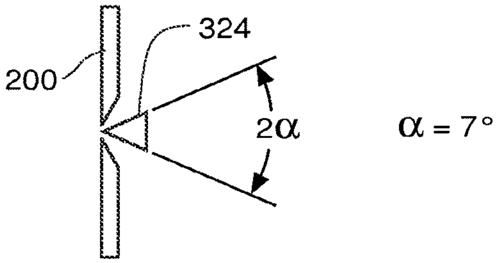

The proposed method of forming an ion beam in a slowly diverging conical duct in accordance with the present disclosure preferably accomplishes the following: (i) the beams formed in the diverging duct do not interact excessively with the inner walls, especially after flow separation takes place, and (ii) as the beam propagates it diverges very slowly. Referring to FIGS. 10A-10C, measurements were performed to characterize the ion beam that forms in the various electrode interfaces measured. Referring to FIG. 10A, the ion beam 320 that forms in the full-length conductive plastic duct 150 has a very small angle of divergence (α) of about 0.6 degrees. On the other hand, beams 322 and 324 (FIGS. 10B and 10C) formed by passing through the orifices of the commercial interfaces 190 and 200, shown in FIGS. 6B and 6C, diverge more quickly and are consequently much wider, with divergences, a, of about 1.8 degrees and 7 degrees, respectively. Also importantly, the tightly focused beam 320 can travel a longer distance before the beam is dissipated by collisions with the residual buffer gas. Such a narrow beam can be efficiently heated by radiation, for example, emitted from an encompassing heated sleeve that is still large enough to prevent losses via interactions with the walls. Alternatively, the holder that couples the tip to the vacuum chamber can be heated.

The divergence of the beams 320, 322, and 324 formed in each of the interfaces were observed by electrospraying a solution of brilliant blue R dye through the different electrodes and allowing the ions and small droplets to interact with a 72 line/inch mesh (90% transmission) positioned at various distances from the entrances. The mesh was then removed and the picture of the spot formed by the beam was taken and analyzed for each electrode interface 150, 190, 200, respectively. The beam 320 formed in the diverging conical duct of the conductive tip 150 was measured to be about 3-10 times tighter than the beams formed in the other interface.

EXAMPLE

We have discovered a way to increase the efficiency of ion transfer from atmosphere into vacuum to almost 100%. This high efficiency was achieved using a novel configuration for the electrode through which ions enter the mass spectrometer. We term this a "ConDuct" electrode because it contains a narrow, slowly diverging conical duct that is able to transmit a large ion current into the vacuum with minimal losses, surpassing performance of all other types of atmosphere vacuum interfaces that utilize orifices or heated metal capillaries. We have constructed a new atmosphere-vacuum ion transmission interface based on the ConDuct electrode and have demonstrated that it can transmit 100-to-1000 times more ions than a typical heated-capillary-skimmer based interface.

Method:

We have modified an LCQ-DECAXP ion trap mass spectrometer (Thermo) by equipping the instrument with two atmosphere-vacuum interfaces that can operate simultaneously. One of these is the original interface of the mass spectrometer containing an 18 cm-long heated metal capillary and a skimmer. The other interface contains a heated holder supporting the ConDuct electrode, a quadrupole ion guide and a skimmer identical to that used in the first interface. Ions from both interfaces are mixed in a T-shaped quadrupole ion guide and transferred to the ion trap. To directly compare the relative ion transmission efficiencies, we used peptides labeled with heavy or light isotopes to distinguish between ions coming from the ConDuct interface and the original interface of the mass spectrometer.

Preliminary Data:

Firstly, we found that a conductive plastic 0.1-10 μl pipette tip can be used as one practical implementation of the ConDuct electrode. The tip contains a 7 mm-long section of slowly diverging conical duct at its tip (the diameter of the entrance is ~0.4 mm), with an angle of divergence ~0.8 degrees.

Secondly, we showed that such a ConDuct electrode transmits 80-99% of the total ion current emitted from a typical nanospray ion source into the vacuum of the mass spectrometer, resulting in absolute transmitted currents >200 nA. We determined that this total ion current was at least 10 times larger than the current transmitted through all the heated capillary geometries in current use and at least several times larger than through the orifice-type interfaces of even larger diameter.

Thirdly, we built a new atmosphere-vacuum interface based on the ConDuct electrode and demonstrated that it can transmit 100-to-1000 times more ions than a typical heated-capillary-skimmer based interface.

We also obtained some experimental evidence that supports our speculations that the phenomenon of flow separation is responsible for the improved ion transmission. Flow separation occurs when a gas moves in a diverging duct with a velocity higher than some critical velocity. We also demonstrated that the ion beam produced this way has the following advantageous properties: (i) it does not interact with the inner walls; and (ii) the beam diverges very slowly as it leaves the duct and propagates through the vacuum.

Our results encourage further exploration of the phenomena involved in the formation of molecular and ion beams as they move through the slow diverging conical ducts and utilization of these phenomena for designing and implementing new atmosphere-vacuum interfaces with increased ion transfer efficiencies into mass spectrometers.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A method for transferring ions from atmosphere to a vacuum chamber of a mass spectra analysis system, the method comprising:

receiving ions from an ion source at atmosphere at an entrance aperture of a diverging duct electrode disposed proximate to the ion source;

conveying the ions through a tube of the diverging duct electrode toward an exit aperture of the diverging duct electrode, the tube having a continuous inner surface defining an enclosed diverging channel between the entrance aperture and the exit aperture, and the exit aperture having an inner diameter larger than an inner diameter of the entrance aperture, the diverging channel narrowing the beam of ions; and injecting the ions from the exit aperture of the diverging duct electrode into the a vacuum chamber of a mass spectra analysis system, the exit aperture being operatively coupled to the vacuum chamber for transferring the ions thereto; and wherein the diverging channel has an angle of divergence greater than 0.5 degrees and less than about 5 degrees.

2. A method as defined in claim 1, wherein the diverging channel has an angle of divergence greater than 0.5 degrees and less than about 5 degrees and a length from about 1 mm to about 200 mm to narrow a beam comprising the ions formed at the entrance aperture and to transport the ions in the narrowed beam to the vacuum chamber.

3. A method as defined in claim 1, wherein the ion source is a nano-flow electrospray ion source.

4. A method as defined in claim 1, further comprising applying a voltage of about 500V to about 5 kV on the ion source.

5. A method as defined in claim 1, further comprising applying a voltage on the diverging duct electrode with a voltage source.

6. A method as defined in claim 1, further comprising heating the ions in the diverging duct electrode to cause desolvation.

7. A method as defined in claim 6, wherein the ions are heated by a heating source providing radiative heat.

8. A method as defined in claim 1, further comprising analyzing the injected ions with a quadrupole mass analyzer.

9. A method as defined in claim 1, wherein the entrance aperture of the diverging duct electrode is positioned a distance of between about 0.1 mm and about 10 mm from an exit port of the ion source.

10. A method as defined in claim 1, wherein an inner diameter of the entrance aperture of the diverging duct electrode is from about 0.1 mm to about 1 mm.

11. A system for mass spectra analysis of ions, the system comprising:

an electrospray ion source for spraying a divergent beam of ions produced by charging droplets of a solution of molecules introduced into the electrospray source, the electrospray ion source comprising an exit port from which the ions are electrosprayed at atmosphere;

a mass analyzer having an inlet port enclosed in a vacuum housing for receiving the ions formed in the electrospray ion source to be analyzed; and an ion transmission interface for transferring the ions from the electrospray ion source to the vacuum housing, the ion transmission interface comprising:

a diverging duct electrode comprising a tube having a continuous inner surface defining an entrance aperture and an exit aperture and an enclosed diverging channel therebetween, the exit aperture having an inner diameter larger than an inner diameter of the entrance aperture, the entrance aperture positioned proximate the exit port of the electrospray ion source and receiving the ions at atmosphere from the electrospray ion source, the diverging channel narrowing the beam of ions; and an electrode holder coupled between the exit aperture of the diverging duct electrode and the vacuum housing for transporting the ions to the mass analyzer under vacuum; and wherein the diverging channel has an angle of divergence greater than 0.5 degrees and less than about 5 degrees.

12. A system as defined in claim 11, wherein the diverging channel has an angle of divergence greater than 0.5 degrees and less than about 5 degrees and a length from about 1 mm to about 200 mm.

13. A system as defined in claim 11, wherein the electrospray ion source is a nano-flow electrospray ion source.

14. A system as defined in claim 11, further comprising a voltage source for applying a voltage of about 500V to about 5 kV on the ion source.

15. A system as defined in claim 11, wherein the ion transmission interface comprises a voltage source for applying a voltage on the diverging duct electrode with a voltage source.

16. A system as defined in claim 11, wherein the ion transmission interface comprises a heating source for heating the ions in the diverging duct electrode to cause desolvation.

17. A system as defined in claim 16, wherein the ions are heated by a heating source providing radiative heat.

18. A system as defined in claim 11, wherein the mass analyzer is a quadrupole mass analyzer.

19. A system as defined in claim 11, wherein the vacuum housing encloses a first vacuum chamber and a second vacuum chamber, the first vacuum chamber enclosing the exit aperture of the diverging duct electrode, the system further comprising a skimmer, the second vacuum chamber enclosing an outlet side of the skimmer and the inlet port of the mass analyzer, and wherein the second vacuum chamber is maintained at a greater vacuum than that of the first vacuum chamber.

20. A system as defined in claim 11, wherein the entrance aperture of the diverging duct electrode is positioned a distance of between about 0.1 mm and about 10 mm from the exit port of the electrospray ion source.

* * * * *